US009433032B1

(12) United States Patent
Ghadge et al.

(10) Patent No.: US 9,433,032 B1
(45) Date of Patent: Aug. 30, 2016

(54) INTERFACE SELECTION FOR QUALITY OF SERVICE ENFORCEMENT

(75) Inventors: Amit Ghadge, Pune (IN); Sridhar Bhaskaran, Coimbatore (IN); Maulik Vaidya, Alpharetta, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 258 days.

(21) Appl. No.: 13/517,813

(22) Filed: Jun. 14, 2012

(51) Int. Cl.
*G01R 31/08* (2006.01)
*H04W 84/08* (2009.01)
*H04W 88/08* (2009.01)

(52) U.S. Cl.
CPC ............. *H04W 84/08* (2013.01); *H04W 88/08* (2013.01)

(58) Field of Classification Search
USPC ................ 370/252, 328, 329, 338, 401, 465
See application file for complete search history.

(56) References Cited

U.S. PATENT DOCUMENTS

| | | | | |
|---|---|---|---|---|
| 8,170,566 B2* | 5/2012 | Pudney | ................ | 455/445 |
| 8,204,062 B2* | 6/2012 | Ahlstrom et al. | ....... | 370/395.21 |
| 8,284,716 B2* | 10/2012 | Martin et al. | ................ | 370/328 |
| 8,451,773 B2* | 5/2013 | Jiao et al. | ...................... | 370/328 |
| 8,477,724 B2* | 7/2013 | Bakker et al. | ................ | 370/331 |
| 2004/0067735 A1* | 4/2004 | Lobley | ........................ | 455/41.2 |
| 2011/0122770 A1* | 5/2011 | Iovieno et al. | ............... | 370/235 |
| 2011/0122817 A1* | 5/2011 | Russell et al. | ................ | 370/328 |
| 2012/0020248 A1* | 1/2012 | Granlund et al. | ........... | 370/254 |
| 2012/0120932 A1* | 5/2012 | Liang et al. | ................... | 370/338 |
| 2012/0147767 A1* | 6/2012 | Yang et al. | ................... | 370/252 |
| 2012/0250660 A1* | 10/2012 | Karlsson | ....................... | 370/332 |
| 2013/0117475 A1* | 5/2013 | Wei et al. | ....................... | 710/33 |

* cited by examiner

*Primary Examiner* — Ricky Ngo
*Assistant Examiner* — Christine Ng
(74) *Attorney, Agent, or Firm* — Patent Capital Group

(57) ABSTRACT

In one embodiment, a method for selecting a software interface based on operator policy comprises receiving from a mobile device a message requesting that a packet data session be allocated, wherein the message includes a requested quality of service profile for the packet data session, selecting a software interface, from among a plurality of software interfaces, for communication with a packet node based on the contents of the message, for the packet node to provide the mobile device with access to a packet data network, and allocating the packet data session in communication with the packet node, wherein the requested quality of service profile is conveyed to the packet node using the selected software interface.

21 Claims, 5 Drawing Sheets

INTERFACE SELECTION FOR QUALITY OF SERVICE ENFORCEMENT

TECHNICAL FIELD OF THE DISCLOSURE

The present disclosure relates generally to a system and method for providing quality of service enforcement in a telecommunications network.

BACKGROUND OF THE DISCLOSURE

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology.

Quality of service enforcement is an important issue in wireless network design. The manner in which quality of service is enforced has evolved along with wireless networks generally. As newer generation mobile devices and networks are deployed at various staggered times, newer and older generations co-exist. Allowing newer generation quality of service enforcement, while retaining support for older generations, is important for maintaining user satisfaction with the network.

DESCRIPTION OF EXAMPLE EMBODIMENTS

Overview

Figure 1:
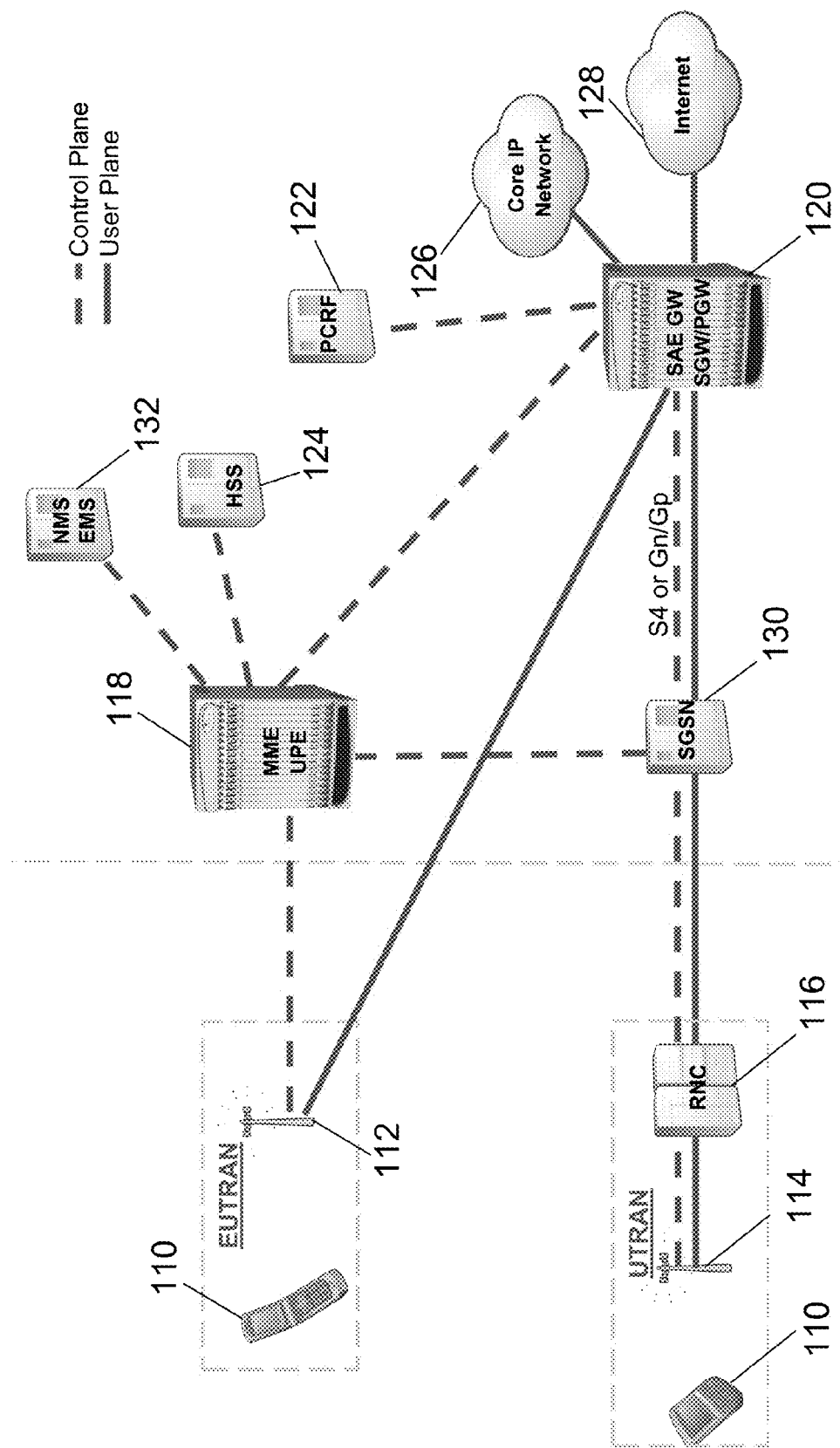
FIG. 1 illustrates a communication network topology in accordance with some embodiments.

Certain embodiments disclose a method for selecting a software interface based on operator policy that comprises receiving from a mobile device a message requesting that a packet data session be allocated, wherein the message includes a requested quality of service profile for the packet data session, selecting a software interface, from among a plurality of software interfaces, for communication with a packet node based on the contents of the message, for the packet node to provide the mobile device with access to a packet data network, and allocating the packet data session in communication with the packet node, wherein the requested quality of service profile is conveyed to the packet node using the selected software interface.

Example Embodiments

This disclosure relates generally to selecting appropriate communication interfaces for quality of service provisioning and enforcement for mobile data connections. Mobile devices such as smartphones, cell phones, and data-cards have continued to proliferate at a rapid pace. At the same time, the sophistication of these devices has increased. Many applications beyond simple phone calls and text messaging are made possible by these new devices and the networks that serve them. Many such applications depend on the reliable delivery of packet data to and from the mobile devices on which they run. To support these applications, many mobile networks allow for the dedication of network resources to provide these packet data flows.

The quality of service offered by a network for these packet data flows is important to both users and network operators. For users, the quality of service obtained by their mobile device directly impacts the quality of their experience. For example, a user streaming video or audio content to their mobile device is likely to have a smoother experience when packets for that stream are delivered in a timely and uninterrupted fashion. In contrast, users of less time-sensitive applications, such as e-mail, may be satisfied with increased latency or delay in the delivery of the packets for those applications. For network operators, fine-grained quality of service control allows network resources to be utilized efficiently. For applications where a subscriber may be annoyed or impaired by even a slight delay, an operator may desire to dedicate extra resources. Alternatively, a network operator can conserve network resources to serve more subscribers where delay or other quality of service reductions are acceptable.

Network operators have evolved their networks to keep up as mobile devices, and the applications that run on those mobile devices, place increasing demands on their networks. To do so, network operators have replaced older network hardware with newer and more sophisticated hardware. New generations of networks provide faster connections, increased reliability and improved user experiences. However, such network upgrades are expensive and typically rolled-out in gradual stages. Throughout the upgrade process, a network operator often wishes to retain compatibility with older mobile devices while simultaneously offering improved service to newer mobile devices.

One such upgrade recently undertaken by many network operators is a transition from Universal Mobile Telecommunications System (UMTS) networks to 3GPP Long Term Evolution (LTE) networks. Such a transition often involves the upgrade of the radio access networks that directly interface with mobile devices, and the core networks that provide connectivity to devices using those radio access networks. For example, a network operator may replace their GERAN or UTRAN radio access network with a newer E-UTRAN radio access network. Newer generation radio access networks may also be deployed in parallel with older networks, increasing the variety of devices that can connect to the network. A network operator may also replace their General Packet Radio Service (GPRS) core network with an Evolved Packet Core (EPC) network. Throughout this process, subscribers may continue to desire service for their older devices if they are unable or unwilling to upgrade their mobile devices. Thus, a subscriber having a mobile device capable of radio access using either GERAN or UTRAN may nonetheless wish to connect to a Long Term Evolution network. Even subscribers with mobile devices capable of accessing Long Term Evolution radio access networks may access Long Term Evolution core networks using GERAN or UTRAN in areas where Long Term Evolution radio coverage is not yet available. This may occur as Long Term Evolution core networks are initially deployed while only existing GERAN or UTRAN coverage is available. To accommodate these types of connections, a network operator may provide access to an Evolved Packet Core network using one or more of these older radio access technologies. Thus, older and newer technologies are interworked so that a variety of mobile devices may be given service by a variety of networks.

Both older generation Universal Mobile Telecommunications System networks and newer generation Long Term Evolution networks provide support for packet data sessions. A packet data session includes an agreement between a mobile device and a network to provide packet delivery under certain terms. For example, a packet data session may be established to access a website or to carry the packets of a streaming video. Each of these uses has differing preferred bit rates. For example, a packet data flow with a low bit rate may not be noticed by a subscriber if it is used to deliver an e-mail message. However, this same bit rate may cause annoying pauses or interruptions when streaming a video or audio file. Quality of Service in a network comprises the agreed-upon terms for bit rates, as well as other aspects of a network connection. These other aspects include delay, jitter, packet drop rates, and error rates. A network may guarantee certain levels or parameters for these aspects to a requesting application and then reserve capacity to meet these guarantees. This type of Quality of Service enforcement is important if a network operator is to reliably support real-time applications that are delay sensitive.

In a Universal Mobile Telecommunications System network, a packet data session is called a Packet Data Protocol (PDP) Context. A mobile device may request that a Packet Data Protocol Context be created by initiating a Packet Data Protocol Context establishment procedure. Before a mobile device can request a Packet Data Protocol Context, the mobile device connects to a Serving General packet radio service Support Node (SGSN). This connection process is called the initial attach procedure. During the initial attach procedure, an SGSN may learn the identity of the connecting mobile device (e.g., that mobile device's International Mobile Equipment Identity (IMEI)). Each Packet Data Protocol Context is associated with Quality of Service parameters based on the information provided by the mobile device at the time of the request. A mobile device may create multiple Packet Data Protocol Contexts if additional packet data sessions are desired. Each Packet Data Protocol Context may be associated with separate Quality of Service parameters.

In an LTE network, a packet data session is called an Evolved Packet System (EPS) bearer. A bearer is a packet flow that is established between a Packet Data Network Gateway and a mobile device. Each mobile device is allocated a default Evolved Packet System bearer upon initial attach. This default bearer provides connectivity, but with nominal expected Quality of Service. If stricter Quality of Service parameters are desired for a particular application, the mobile device may establish additional bearers, called dedicated Evolved Packet System bearers. A dedicated Evolved Packet System bearer may be associated with stricter Quality of Service parameters. A bearer is the level of granularity for bearer-level Quality of Service control.

The traffic that runs across a bearer can be further subdivided into Service Data Flows (SDFs) for even greater granularity. A Service Data Flow may be a single packet flow (e.g., for a single application or application function).

The Evolved Packet System supports two general types of bearers. The first type of bearer is a Guaranteed Bit Rate bearer. A Guaranteed Bit Rate bearer is allocated dedicated network resources when the bearer is established or modified. These resources are allocated for the life of the bearer. Use cases for Guaranteed Bit Rate bearers include carrying voice or video traffic where packet delays may significantly impair the user experience. The second type of bearer is a non-Guaranteed Bit Rate bearer. Use cases for non-Guaranteed Bit Rate bearers include delivering e-mail or downloading files. In these use cases, packet delay does not significantly impair user experience.

In return for offering packet data services to their subscribers, network operators strive to charge those subscribers fairly. This charging is often based on the numbers of packets that are delivered to and from the mobile devices of those subscribers. The Policy and Charging Rules Function (PCRF) is a network node that determines and manages policy rules for the network. Among these policies are the policies for Quality of Service enforcement and associated subscriber charging. The Policy and Charging Rules Function may communicate with a Subscription Profile Repository (SPR) node to access subscription-specific input when generating its Quality of Service and charging policies. These nodes are part of the larger Policy and Charging Control (PCC) framework that has been standardized by the 3GPP. Also within this framework is the Policy and Charging Enforcement Function (PCEF) node. The Policy and Charging Enforcement Function requests and receives rules from the Policy and Charging Rules Function node. In turn, the Policy and Charging Enforcement Function node detects applicable packets sent to and from a subscriber and enforces the policies received from the Policy and Charging Rules function. Together, these nodes determine Quality of Service and charging policies for a given subscriber, and enforce those policies.

As mentioned above, newer Evolved Packet Core networks may be compatible with older mobile devices, or UEs, that utilize radio interfaces such as GERAN or UTRAN. For these older UEs and radio access networks, both Guaranteed Bit Rate and non-Guaranteed Bit Rate bearers have separate Maximum Bit Rates per bearer. For Guaranteed Bit Rate bearers, there is a separate Maximum Bit Rate and Guaranteed Bit Rate per bearer. In contrast, there is no separate Maximum Bit Rate per bearer for non-Guaranteed Bit Rate bearers in the Evolved Packet System. Instead, aggregate bit rates such as the Per-Access Point Name Aggregate Maximum Bit Rate are used in the Evolved Packet System.

When a UE connects to an Evolved Packet Core network using one of these older radio access networks, bearer requests and interactions are mapped to those of the newer Evolved Packet System bearers. For example, a UE connecting to an Evolved Packet Core network using either GERAN or UTRAN has its Packet Data Protocol Context interactions mapped to Evolved Packet System bearers within the core network. Due to the differences between these packet data session types, there are issues with Quality of Service provisioning and enforcement when interactions are mapped in this fashion.

As mentioned above, each bearer established for a mobile device has associated Quality of Service parameters. Collectively, these parameters are known as a Quality of Service profile. A Quality of Service profile associated with an Evolved Packet System bearer can include at least the following parameters: (1) Quality of Service Class Identifier (QCI), (2) Allocation and Retention Priority (ARP), (3) Guaranteed Bit Rate, and (4) Maximum Bit Rate. Each Guaranteed Bit Rate Evolved Packet System bearer is assigned values corresponding to each of these four parameters as part of its Quality of Service Profile. A non-Guaranteed Bit Rate Evolved Packet System bearer may be assigned only a subset of these parameters, such as a Quality of Service Class Identifier and an Allocation and Retention Priority but neither of the bit rate parameters. In addition to (but independent of) bearer-level Quality of Service control, the Policy and Charging Control framework allows optional Quality of Service enforcement and control at an increased level of granularity. This enforcement operates at the granularity of Service Data Flows (SDFs) and is independent of the mapping of Service Data Flows to Evolved Packet System bearers.

The Quality of Service Class Identifier parameter defines node-specific parameters that control bearer-level packet forwarding policies. These policies include, for example scheduling weights, admission thresholds, queue management thresholds, and link layer protocol configuration. This parameter is stored as a scalar value that maps to settings that may be pre-configured by the operator of an access node (e.g., an evolved nodeB). A one-to-one mapping of standardized Quality of Service Class Identifier values to standardized characteristics is described in the 3GPP TS 23.203 specification.

The Allocation and Retention Priority parameter contains information about the priority level (a scalar value), the pre-emption capability (a binary flag) and the pre-emption vulnerability (a binary flag) of its associated bearer. The primary role of this parameter is to aid network nodes in decisions of whether to accept or to reject bearer requests (e.g., to establish or to modify a bearer) based on resource limitations. An example of such a resource limitation may be insufficient radio capacity to accommodate Guaranteed Bit Rate bearers. Each Evolved Packet System bearer may be assigned a unique combination of Quality of Service Class Identifier and Allocation and Retention Priority.

The Guaranteed Bit Rate parameter describes the bit rate expected to be provided to a Guaranteed Bit Rate bearer. The Radio Access Network and core network are expected to reserve this agreed-upon bit rate for its associated bearer. This parameter is applicable to Guaranteed Bit Rate bearers. This and other bit rate parameters may have both an uplink (i.e., from mobile device to network) and a downlink (i.e., from network to mobile device) component.

The Maximum Bit Rate parameter describes the expected limit of the bit rate provided by a bearer. Excess traffic beyond the Maximum Bit Rate may be discarded (e.g., by a rate-shaping function) or be forwarded with a lower priority than other traffic. Such a reduction in priority may be controlled at an Internet Protocol (IP) level using the Differentiated Services Code Point (DSCP) parameter. The Maximum Bit Rate of a particular Guaranteed Bit Rate bearer may be set larger than the Guaranteed Bit Rate of that bearer. This parameter is applicable for both Guaranteed Bit Rate bearers and for non-Guaranteed Bit Rate bearers.

Beyond the Quality of Service profile parameters associated with each individual bearer in the Evolved Packet System, each Access Point Name (APN) access by a UE is additionally associated with a Per-Access Point Name Aggregate Maximum Bit Rate (APN-AMBR) Quality of Service parameter. An Access Point Name refers to the packet network that provides packet connectivity to a UE. Thus, this parameter limits the aggregate bit rate expected to be provided across all non-Guaranteed Bit Rate bearers and across all packet data network (PDN) connections of the UE from a particular packet network. A Packet Data Network Gateway (PGW) enforces the downlink Per-Access Point Name Aggregate Maximum Bit Rate. Uplink Per-Access Point Name Aggregate Maximum Bit Rate is enforced both by the Packet Data Network Gateway and by the UE.

Each UE is additionally associated with a Per-UE Aggregate Maximum Bit Rate (UE-AMBR) Quality of Service parameter by the Evolved Packet System. This parameter limits the aggregate bit rate expected to be provided across all non-Guaranteed Bit Rate bearers of a UE. This parameter may be set as the sum of the Per-APN Aggregate Maximum Bit Rates of all active Access Point Names for a UE, up to the value of the subscribed Per-UE Aggregate Maximum Bit Rate. Excess traffic may be discarded by a rate-shaping function. E-UTRAN enforces the Per-UE Aggregate Maximum Bit Rate in both uplink and downlink rates.

An Evolved Packet System operator is well-equipped to control Quality of Service using the parameters described above. However, with the different possible access types (e.g., UTRAN, GERAN or E-UTRAN) supported by the Evolved Packet Core, various issues arise due to limitations in the Evolved Packet Core procedures in communicating appropriate Quality of Service parameters between network nodes. For example, a discrepancy in bit rates stored by the radio access network and the core network may be created due to these limitations.

FIG. 1 illustrates a network diagram in accordance with certain embodiments. FIG. 1 illustrates a Universal Mobile Telecommunication System (UMTS) release 8 network along with a Long Term Evolution (LTE) network. The network diagram of FIG. 1 includes user equipment (UE) 110, an evolved nodeB (eNB) 112, a nodeB 114, a radio network controller (RNC) 116, a mobility management entity (MME)/user plane entity (UPE) 118, a system architecture evolution gateway (SAE GW) 120, a policy and charging rules function (PCRF) 122, home subscriber server (HSS) 124, core IP network 126, internet 128, Serving General packet radio service Support Node (SGSN) 130, and network management system (NMS)/element management system (EMS) 132. The MME 118, SGSN 130, and SAE GW 120 can be implemented in a gateway as described below. The SAE GW 120 can include a serving gateway (SGW) as well as a packet data network gateway (PGW). In some embodiments, the SGW and PGW can be implemented on separate network devices. The main component of the SAE architecture is the Evolved Packet Core (EPC), also known as SAE Core. The EPC includes the MME, SGW and PGW components. The user equipment (UE) can include a mobile phone, a laptop with wireless connectivity, a netbook, a smartphone, or any other wireless device.

MME 118 is a control-node for the LTE access network. The MME 118 is responsible for UE 110 tracking and paging procedures including retransmissions. MME 118 handles the bearer activation/deactivation process and is also responsible for choosing the SGW for a UE 110 at the initial attach and at time of an intra-LTE handover. The MME 118 also authenticates the user by interacting with the HSS 124. The MME 118 also generates and allocates temporary identities to UEs and terminates Non-Access Stratum (NAS) signaling. The MME 118 checks the authorization of the UE 110 to camp on the service provider's Public Land Mobile Network (PLMN) and enforces UE roaming restrictions. The MME 118 is the termination point in the network for ciphering/integrity protection for NAS signaling and handles the security key management. Lawful interception of signaling is also supported by the MME 118. The MME also provides the control plane function for mobility between LTE and 2G/3G access networks with the S3 interface terminating at the MME 118 from the SGSN 130. The MME 118 also terminates the S6a interface towards the home HSS for roaming UEs. The SGSN 130 may also establish a Gn/Gp interface towards a Gateway GPRS Support Node (GGSN) (not shown).

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the downlink data path and triggers paging when downlink data arrives for the UE 110. The SGW manages and stores UE contexts, e.g. parameters of the IP bearer service and network internal routing information. The SGW also performs replication of the user traffic in case of lawful interception. The PGW provides connectivity to the UE 110 to external packet data networks by being the point of exit and entry of traffic for the UE 110. A UE 110 may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 (CDMA 1× and EvDO). The policy and charging rules function (PCRF) 122 may be co-located with the PGW.

The NMS/EMS 132 can provide management of the operation, administration, maintenance, and provisioning of networked system. Operation deals with keeping the network (and the services that the network provides) up and running smoothly, and includes monitoring to detect problems and minimize disruptions on the network. Administration deals with keeping track of resources in the network and how they are assigned. Maintenance is concerned with performing repairs and upgrades—for example, when equipment must be replaced, when a router needs a patch for an operating system image, when a new switch is added to a network. Provisioning is concerned with configuring resources in the network to support a given service. For example, this might include setting up the network so that a new customer can receive service. Functions that are performed as part of network management accordingly include controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, and accounting management. An element management system (EMS) consists of systems and applications that manage network elements (NE) on the network element management layer (NEL) of the Telecommunication Management Network model.

As mentioned above, the user equipment (UE) may be in an active or an idle state. Whether the UE is in an active state can depend on the state of a packet data session, and whether there is an active packet data session. The idle state is a sleep mode state that can be used to conserve battery life of user equipment by minimizing the need to power receivers to be ready for radio signals. The paging indicators are usually broadcast from a number of cells because user equipment may move while in an idle state. For user equipment in an idle state, the SGW can buffer IP packets received for the user equipment and can initiate page requests towards the MME or SGSN. If the user equipment responds to the page, the SGW forwards the IP packet to the eNB in a LTE network or to a RNC/NB or RNC/BS in UMTS/general packet radio service (GPRS) for delivery to the user equipment.

The SGSN 130 is responsible for the delivery of data packets for a Packet Data Network to and from mobile devices. A radio access network provides connectivity between an SGSN and mobile devices. A mobile device may be connected to many base stations that are part of that radio access network while its connection is managed by a single SGSN. That SGSN may also perform a handoff so that a new SGSN serves that mobile device. A Packet Data Network Gateway provides connectivity between a Packet Data Network and an SGSN.

Where older radio access networks (e.g., GERAN or UTRAN) are interworked with an Evolved Packet Core network, an SGSN may serve as an intermediary between UEs using these radio access networks and packet data networks. In these cases, the SGSN may obtain access to a packet data network through a Packet Data Network Gateway node. An SGSN may provide a UE with access to a packet data network via a Packet Data Network Gateway in at least two ways. In the first way, the SGSN provides a connection for the UE to the Packet Data Network Gateway using the Gn/Gp software interface. In this mode, the Gn/Gp software interface defines the manner in which the SGSN may communicate with the Packet Data Network Gateway. In this case, the Packet Data Network Gateway performs the functions of a Gateway GPRS Support Node (GGSN). In the second way, the SGSN connects to a Serving Gateway using the S4 software interface, and the Serving Gateway interacts with the Packet Data Network Gateway to provide the UE with Packet Data Network connectivity. The second way is possible if the SGSN supports the S4 software interface. Otherwise, the Gn/Gp software interface may be used as described above. Differences in the capabilities and operation of the S4 and Gn/Gp software interfaces creates issues for connections to the Evolved Packet Core network using these radio access networks. The following sections describe some of these issues.

1. Discrepancy in Bit Rate Between Radio Access Network and Packet Data Network Gateway when Using S4 Interface.

For UE connections using GERAN or UTRAN, Evolved Packet Core bearers are mapped to Packet Data Protocol Contexts. In doing so, an SGSN may map the Evolved Packet Core Quality of Service parameters to GPRS Mobility Management Quality of Service parameters. An SGSN may do this when sending or receiving Packet Data Protocol Context messages (e.g., Packet Data Protocol Context Accept or Modify Packet Data Protocol Context Accept messages).

Information regarding requested Quality of Service levels is carried by Information Elements (IEs) that are transmitted as part of various network procedures. For example, a UE may include a Bearer Quality of Service Information Element in a message initiating a bearer allocation procedure or a bearer modification procedure. Such an Information Element may be transmitted to a Mobility Management Entity or to an SGSN. This information is then conveyed on to a Packet Data Network Gateway using a Flow Quality of Service Information Element. For Guaranteed Bit Rate bearers, the Flow Quality of Service Information Element carries both the Guaranteed Bit Rate parameter and the Maximum Bit Rate parameter. However for non-Guaranteed Bit Rate bearers, the Flow Quality of Service Information Element carries the Guaranteed Bit Rate and Maximum Bit Rate parameters with values of zero bits-per-second. Thus, for the setup or modification of a non-Guaranteed Bit Rate bearer requested by a UE, the Maximum Bit Rate cannot be conveyed to the Packet Data Network Gateway or the Policy and Charging Rule Function. This limits the ability of the Policy and Charging Rule Function in making an informed decision to authorize the requested Maximum Bit Rate while following individual Policy and Charging Control Rules.

For non-Guaranteed Bit Rate bearers, a Guaranteed Bit Rate is not applicable. For these bearers, the Bearer Quality of Service and the Flow Quality of Service Information Elements carry Maximum Bit Rate parameters having a value of zero. Thus, for the setup or modification of a non-Guaranteed Bit Rate requested by a UE, the Maximum Bit Rate requested by a UE cannot be conveyed to the Packet Data Network Gateway or Policy and Charging Rule Function. This limits the ability of the Policy and Charging Rule Function in making an informed decision to authorize the requested Maximum Bit Rate while following individual Policy and Charging Control Rules.

As described above, if the SGSN has selected the S4 interface, the Maximum Bit Rate and Guaranteed Bit Rate parameters are received by an SGSN from a Packet Data Network Gateway with values of zero for non-Guaranteed Bit Rate bearers. However, the SGSN may nonetheless map Per-Access Point Name Aggregate Maximum Bit Rate to Maximum Bit Rate when passing these messages on to the radio access network (e.g., GERAN or UTRAN) and the UE. If this is done then a data rate equal to the Per-Access Point Name Aggregate Maximum Bit Rate may be allowed for each non-Guaranteed Bit Rate bearer of that UE by the radio access network. In contrast, the Per-Access Point Name Aggregate Maximum Bit Rate is enforced in the aggregate for all the non-Guaranteed Bit Rate bearers that use the same Access Point Name at the Packet Data Network Gateway. Thus there is a discrepancy in Per-Access Point Name Aggregate Maximum Bit Rate enforcement in this case.

This scenario also leads to inefficient use of radio access network and core network resources. This is because a UE is allowed to send traffic beyond the actual allowed data rate of Per-Access Point Name Aggregate Maximum Bit Rate. This can lead to a poor user experience. For example, if the UE is transmitting packets using a Transmission Control Protocol (TCP) connection, there may be increased packet retransmission.

This inefficient use of resources can also lead to the over-charging of a subscriber. In this scenario, the UE is allowed to send traffic beyond what is allowed by the Per-Access Point Name Aggregate Maximum Bit Rate. However, the enforcement of this bit rate at the Packet Data Network Gateway may drop excess traffic. Policy and Charging Control enforcement may also cause this excess traffic to be dropped. Despite being dropped, this excess traffic may still be charged to the subscriber. This occurs when charging is based on packets that are received by a Packet Data Network Gateway. Thus, even if packets are subsequently dropped at the Packet Data Network Gateway (rather than passed on to the Packet Data Network), the subscriber may nonetheless be charged.

2. Inappropriate Maximum Bit Rate Assigned by Policy and Charging Rule Function when Using the S4 Interface.

When a UE using GERAN or UTRAN requests a packet data session from an SGSN interworked with an Evolved Packet Core network, there are issues conveying the requested data rates using the S4 interface. Specifically, when the S4 interface is used for the setup or modification of non-Guaranteed Bit Rate bearers, the data rates requested by a UE are not conveyed to a Packet Data Network Gateway by some Evolved Packet Core procedures. For example, the Bearer Resource Command procedure carries the Flow Quality of Service Information Element with Maximum Bit Rate and Guaranteed Bit Rate parameters set to zero for non-Guaranteed Bit Rate bearers. Thus, the bit rates requested by the UE are not conveyed from the SGSN to the Packet Data Network Gateway when the SGSN uses the S4 interface. As a result, the Policy and Charging Enforcement Function of the Packet Data Network Gateway is not informed of the Maximum Bit Rate requested by the UE. In turn, the Packet Data Network Gateway is unable to convey the requested data rate for the new flow addition to the Policy and Charging Rule Function.

Despite this lack of information, the Policy and Charging Rule Function may allocate a non-zero Maximum Bit Rate for each Policy and Charging Control rule that it sends to the Policy and Charging Enforcement Function. Thus, bit rates differing from those requested by a subscriber may be allocated when flows are created, modified, or deleted. The Policy and Charging Rule Function may allocate Maximum Bit Rates based on local configuration (as per Policy and Charging Control rules) or based on information provided by the Subscription Profile Repository. However, data rates provided based on local configuration or provided by the Subscription Profile Repository may be less appropriate than the rates requested by a UE. This is caused by the dynamic nature of the applications that run on a UE generating dynamic resource requests.

After a non-Guaranteed Bit Rate bearer is setup, a UE may request that new Service Data Flows be added to that bearer. As with the Bearer Resource Command procedure, the Flow Quality of Service Information Element for non-Guaranteed Bit Rate bearers has a Maximum Bit Rate set to zero when using the S4 interface. Therefore, the UE-requested Maximum Bit Rate cannot be conveyed to the Policy and Charging Rules Function. As a result, the Policy and Charging Rules Function may assign a fixed Maximum Bit Rate (based on local configuration or the Subscription Profile Repository) to the corresponding Policy and Charging Control rules. The Maximum Bit Rate assigned in this way may differ from the rate requested by the UE. Additionally, the authorized Maximum Bit Rate is not conveyed back to SGSN through the S4 interface. Thus, the SGSN uses the Access Point Name Aggregate Maximum Bit Rate as the Maximum Bit Rate data rate for the bearer and sends it to the UE in response to the UE's request.

3. Inconsistent Subscriber Experience for Connections Via the S4 Interface as Opposed to the Gn/Gp Interface.

The Quality of Service Data Rates provided to a GERAN or UTRAN subscriber will differ depending on whether that subscriber's SGSN selects the S4 interface or the Gn/Gp interface. In the case of a connection using the Gn/Gp interface, the Packet Data Network Gateway may be provided with the exact data rates requested by the UE. This is so because the Quality of Service Information Element supported by the Gn/Gp interface can carry bearer-level Maximum Bit Rates for non-Guaranteed Bit Rate bearers. As the Packet Data Network Gateway is aware of the data rates requested by the UE, it can convey that information to the Policy and Charging Rule Function.

Additionally, the Packet Data Network Gateway can send the actual bearer-level Maximum Bit Rate back to the SGSN using the Gn/Gp interface. In this case, the Maximum Bit Rate can be set to the sum of the Maximum Bit Rates of the Policy and Charging Control rules bound to that non-Guaranteed Bit Rate bearer. In the case of Packet Data Network Gateway-initiated Quality of Service modifications, the Update request message sent from the Packet Data Network Gateway can carry the Maximum Bit Rate, calculated in the manner as described above, for the non-Guaranteed Bit Rate bearer. In this case, the Per-Access Point Name Aggregate Maximum Bit Rate can be transmitted separately to the SGSN.

In contrast, the S4 interface does not support the transmission of Maximum Bit Rates for non-Guaranteed Bit Rate bearers because the Flow and Bearer Quality of Service Information Elements of the S4 interface do not support that parameter. Thus, when an SGSN selects the S4 interface to interact with a Packet Data Network Gateway via a Serving Gateway, the Packet Data Network Gateway is not able to pass the data rates requested by the UE on to the Policy and Charging Rule Function.

Similarly, the Packet Data Network Gateway is unable to send the actual Maximum Bit Rate back to the SGSN using the S4 interface. This is because the Evolved Packet Core procedures that use the S4 interface (e.g., the Create Bearer, Update Bearer, or Bearer Resource Command procedures) cannot carry bearer-level Maximum Bit Rates for non-Guaranteed Bit Rate bearers. In this case, the SGSN sets the Per-APN Aggregate Maximum Bit Rate as the Maximum Bit Rate for the non-Guaranteed Bit Rate bearer.

4. Inconsistent Subscriber Experience if UE Anchored at a Packet Data Network Gateway as Opposed to a Standalone Gateway GPRS Support Node.

As described above, a Packet Data Network Gateway typically supports the Gn/Gp interface and provide the functions of a Gateway GPRS Support Node to an SGSN. However, the subscriber experience in this case is different than if the SGSN were connected directly to a standalone Gateway GPRS Support Node. This is because the authorized Quality of Service for non-Guaranteed Bit Rate bearers differs depending on whether the subscriber's Packet Data Network is anchored at a Packet Data Network Gateway or at a standalone Gateway GPRS Support Node.

This difference stems from the different IP Connectivity Access Network (IP-CAN) type that is indicated by a Packet Data Network Gateway as opposed to that indicated by a standalone Gateway GPRS Support Node. A Packet Data Network Gateway has an IP Connectivity Access Network type corresponding to the Evolved Packet Core. In contrast, a standalone Gateway GPRS Support Node has an IP Connectivity Access Network type corresponding to General Packet Radio Service.

Where the IP Connectivity Access Network type corresponds to the Evolved Packet Core, the bearer-level Quality of Service for non-Guaranteed Bit Rate bearers is set by the Packet Data Network Gateway using its Policy and Charging Enforcement Function. In contrast, where the IP Connectivity Access Network type corresponds to General Packet Radio Service, the bearer-level Quality of Service is set different depending on the Bearer Control Mode (BCM). Bearer Control Mode defines the entities that are able to request additional packet data sessions, such as Packet Data Protocol Contexts. When Bearer Control mode is UE-only, only a UE may request additional packet data sessions. When Bearer Control Mode is mixed, both UEs and the network may request additional packet data sessions.

Where the IP Connectivity Access Network type corresponds to General Packet Radio Service and the Bearer Control Mode is UE-only, the bearer-level Quality of Service for non-Guaranteed Bit Rate bearers is set by the Policy and Charging Rule Function. In this case, the standalone Gateway GPRS Support Node sends the requested Quality of Service obtained from the UE to the Policy and Charging Control Function for authorization. In turn, the Policy and Charging Rule Function authorizes the requested Quality of Service at the bearer level of granularity and sends it on to the Policy and Charging Enforcement Function. This messaging may be done using either the Credit-Control Answer (CCA) command or the Re-Authentication Request (RAR) command. The Policy and Charging Control rules bound to the bearer by the Policy and Charging Rule Function also defines authorized Quality of Service levels. The authorized Quality of Service for the bearer is then sent by the Gateway GPRS Support Node to the SGSN in either a response message or in an update request message. This method provides the SGSN with more accurate Quality of Service parameters than where a Packet Data Network Gateway provides there parameters.

Where the IP Connectivity Access Network type corresponds to General Packet Radio Service and the Bearer Control Mode is mixed, the Gateway GPRS Support Node sets bearer-level Quality of Service for non-Guaranteed Bit Rate bearers using its Policy and Charging Enforcement Function in combination with the Policy and Charging Control Function. In this case, the Gateway GPRS Support Node sends the requested Quality of Service to the Policy and Charging Rules Function for authorization. The Policy and Charging Rules Function then authorizes a Maximum Bit Rate per Quality of Service Class Identifier. For each such identifier, the Policy and Charging Rules Function activates corresponding rules as per UE-requested flows. These rules, as well as any network-assigned Policy and Charging Control rules, are sent to the Policy and Charging Enforcement Function. The Policy and Charging Enforcement Function then derives the Maximum Bit Rate for the bearer by setting the value to sum of the Maximum Bit Rates allowed by the Policy and Charging Control rules bound to that bearer (by the Policy and Charging Rules Function or the Policy and Charging Enforcement Function). As when the Bearer Control Mode is UE-only, this method provides the SGSN with more accurate Quality of Service parameters than where a Packet Data Network Gateway provides there parameters.

Software Interface Selection Policies

A Serving GPRS Support Node (SGSN) may select the S4 software interface for use with some UEs and the Gn/Gp interface for use with other UEs. As described above, there are consequences to an SGSN's selection of either of these interfaces. In particular, there are issues with Quality of Service mapping and enforcement if the S4 interface is selected for use with a UE or radio access network that does not fully support the Long Term Evolution standard (e.g., pre-release 8 UEs or Radio Access Networks). For example, a UE connecting to an Evolved Packet Core using either GERAN or UTRAN may experience these issues if the SGSN assigned to that UE selects the S4 interface for use with that UE.

These older UEs do not support the Evolved Packet Core Quality of Service data rates (e.g., Per-Access Point Name or Per-UE Aggregate Maximum Bit Rates). Therefore, an SGSN may select the Gn/Gp interface instead of the S4 interface in order to avoid the Quality of Service issues described above. Such UEs may be E-UTRAN capable UEs that have pre-Release 8 compliant radio access network stacks or UEs that otherwise do not support the Evolved Packet Core Quality of Service data rates.

One possible policy for an SGSN supporting both the S4 and the Gn/Gp interfaces is to always select the S4 interface. However, this strategy results in the issues described above for some UEs. Another possibility is to take UE capability into account when making the decision of which interface to use. For example, if a UE does not support per-Access Point Name or per-UE Aggregate Maximum Bit Rates, then the Gn/Gp interface may be selected regardless of the UE's other capabilities. Alternatively, an SGSN may select the S4 interface for UEs that are E-UTRAN capable or support newer GERAN or UTRAN stacks (e.g., 3GPP release 8 or newer), and the Gn/Gp interface for other UEs. However, selection using this type of information may be insufficient. If a more informed decision is to be made, such an SGSN may instead use information provided by a UE or pre-configured operator policies to determine the proper interface for that UE. For example, existing UEs indicate support for Network Controlled Quality of Service using the Network Request Support UE (NRSU) flag in the Protocol Control Options (PCO) Information Element. UEs that are GERAN or UTRAN capable and do not include this flag in the Protocol Control Options Information Element can be considered to not support Evolved Packet Core Quality of Service data rates.

For each UE, an SGSN's selection of either the Gn/Gp mode or the S4 mode can also be based on pre-configured operator policy. An operator may have advance knowledge of the preferred interface for a given UE or group of UEs. If an operator leverages this knowledge to create policies for interface selection, that operator's network can avoid selecting S4 mode in cases that may lead to the Quality of Service enforcement and mapping issues described above. Such operator policies may be based on unique UE identifiers (e.g., a UE's International Mobile Equipment Identity) or by checking the content of messages (e.g., for particular flags) that are transmitted by a UE.

1. UE Identity-Based Selection Policy.

Figure 2:
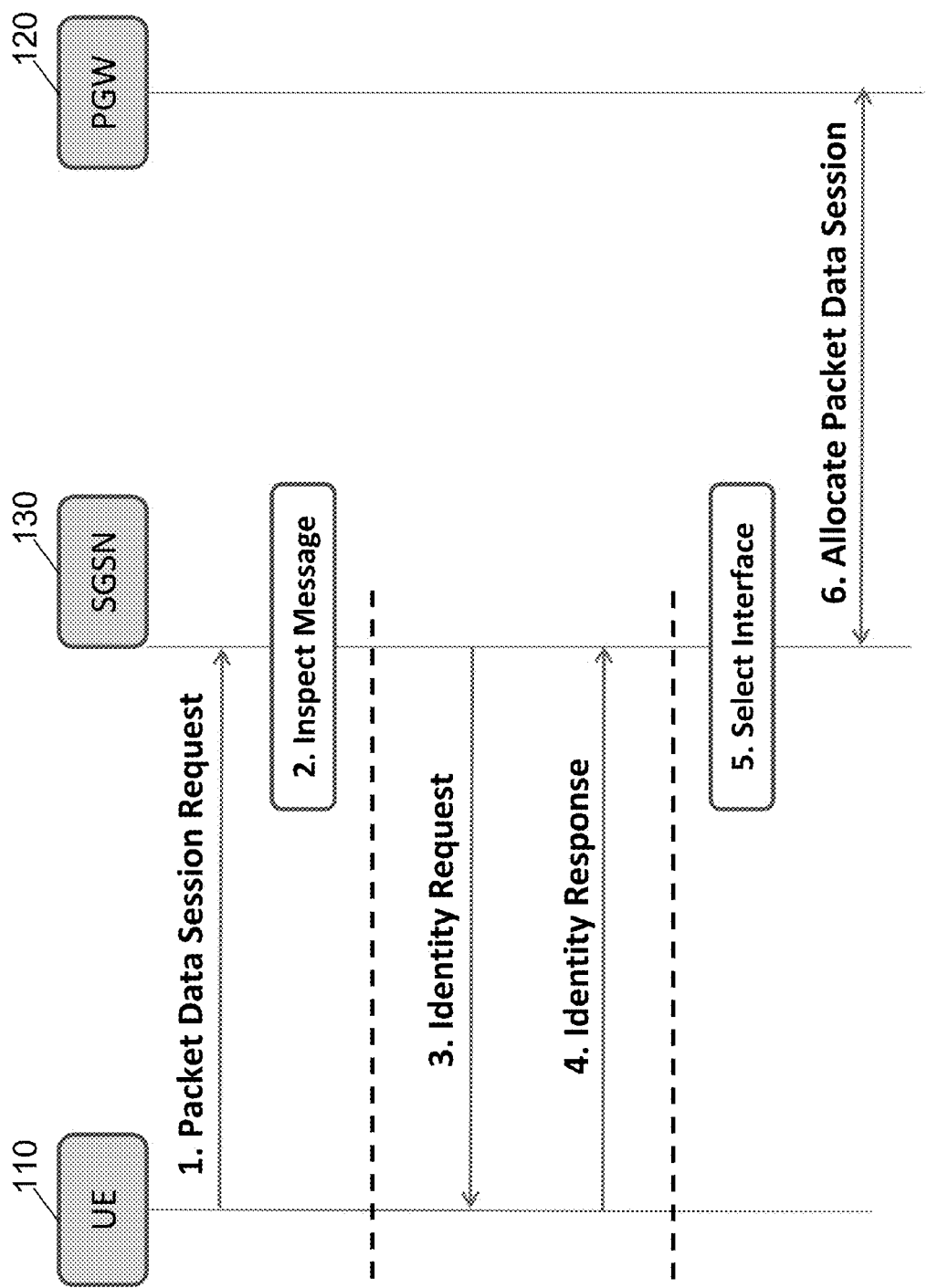
FIG. 2 is a message diagram illustrating interface selection in accordance with some embodiments.

FIG. 2 illustrates a method of selecting a software interface based on operator policy. FIG. 2 includes a UE 110, an SGSN 130, and a Packet Data Network Gateway (PGW) 120. In Step 1, the selection procedure begins with the UE 110 sending the SGSN 130 a message requesting that a packet data session be created. This message may include a requested Quality of Service profile for that packet data session. In some embodiments, this message may be a Packet Data Protocol (PDP) Context Activation message.

In Step 2, the SGSN 130 inspects the message received in step 1. In some embodiments, the SGSN 130 may use the message to determine if an identifier for the sending UE was learned during an initial attach procedure. This identifier may be the UE's International Mobile Equipment Identity. If such an identifier is not found, the method may proceed to Step 3. Otherwise, the method proceeds to Step 5. In Step 3, the SGSN 130 sends an message to the UE 110 requesting that the UE 110 transmit an identifier to the SGSN 130. In Step 4, the SGSN 130 receives the identity information that was requested in Step 3.

In Step 5, the SGSN 130 selects the proper software interface to use for the UE 110 based on the information obtained in the previous steps. The SGSN 130 may do this by matching the UE identity obtained in either Step 2 or Step 4 to an operator-configured identity list stored on (or otherwise accessible by) the SGSN 130. This list includes at least UE identifiers and the interface to select for a UE having each identifier (e.g., either the S4 or the Gn/Gp software interface). The identifiers may be stored as individual identifiers or as ranges of identifiers. The ranges of identifiers may be specified using wildcard characters. If a list entry is located for the requesting UE's identifier, then the corresponding interface can be selected. In Step 6, the SGSN 130 allocates the requested packet data session using the software interface selected in Step 5. The requested Quality of Service profile may be transmitted to the Packet Data Network Gateway 120 using this interface. In some embodiments, the packet data session is allocated in co-ordination with a Packet Data Network Gateway 120.

For example, if the operator of an SGSN 130 knows in advance that a UE having a particular identity does not support Evolved Packet Core Quality of Service parameters, then the operators may add a list entry containing that UE's identity and the instruction to select the Gn/Gp interface for that UE. In this way, the SGSN 130 will select the Gn/Gp interface for the UE and avoid or reduce the Quality of Service issues described above.

In another example, the operators of an SGSN 130 may purchase a batch of UEs from a particular vendor. If the operator is aware that none of these UE support Evolved Packet Core Quality of Service Parameters, the operator may add a list entry identifying the range of identifiers for this batch of UEs, along with the instruction to select the Gn/Gp interface for any UE with an identifier in this range. If a batch of 100,000 UEs had identifiers in the range from 012300000 to 012399999, the operator may add a list entry identifying this range as "0123*" along with an instruction to select the Gn/Gp interface for any UE with an identifier in that range. In this way, the SGSN 130 is configured to select the Gn/Gp interface for any of the UEs in the batch purchased from the particular vendor and avoid or reduce the Quality of Service issues described above.

2. Flag-Based Selection Policy.

In an alternative embodiment of Step 2 shown in FIG. 2, the SGSN 130 may inspect the message for flags indicating the capabilities of the UE 110. The communication of the Protocol Control Options Information Element between a UE and a Packet Data Network Gateway or Gateway GPRS Support Node (GGSN) occurs transparently through various radio and core nodes. One such node may be an SGSN 130. In this case, the SGSN 130 may implement logic to decode the Protocol Control Options (PCO) Information Element in an Activate Packet Data Protocol Context Request message sent from a UE. Once decoded, the SGSN 130 can check for the presence or absence of the Network Request Support UE flag.

In this embodiment, the SGSN 130 may select the proper interface (e.g., use of either the S4 or Gn/Gp interface) in Step 5 based on the presence or absence of this flag. If the flag is not detected, the SGSN 130 can determine that the UE does not support the Evolved Packet Core Quality of Service parameters and accordingly select the Gn/Gp interface. If the flag is detected, then the SGSN can accordingly select the S4 interface. This strategy avoids many of the Quality of Service mapping and enforcement issues described above.

3. Combined Identity- and Flag-Based Policies.

In yet another embodiment, where both UE identity-based and flag-based policies are provisioned, the SGSN 130 can determine which policy to follow based on the flags that are found in Step 2. For example, the determination of which policy to follow can be based on the presence or absence of the Protocol Control Options Information Element. If this Information Element is present in a request from a UE, then the selection of the proper interface in Step 5 can be based on the presence of flags within this Information Element as described above in the flag-based policy. If this Information Element is not present, then the determination of the interface to use can be based on the identity of the UE as described above.

Figure 3:
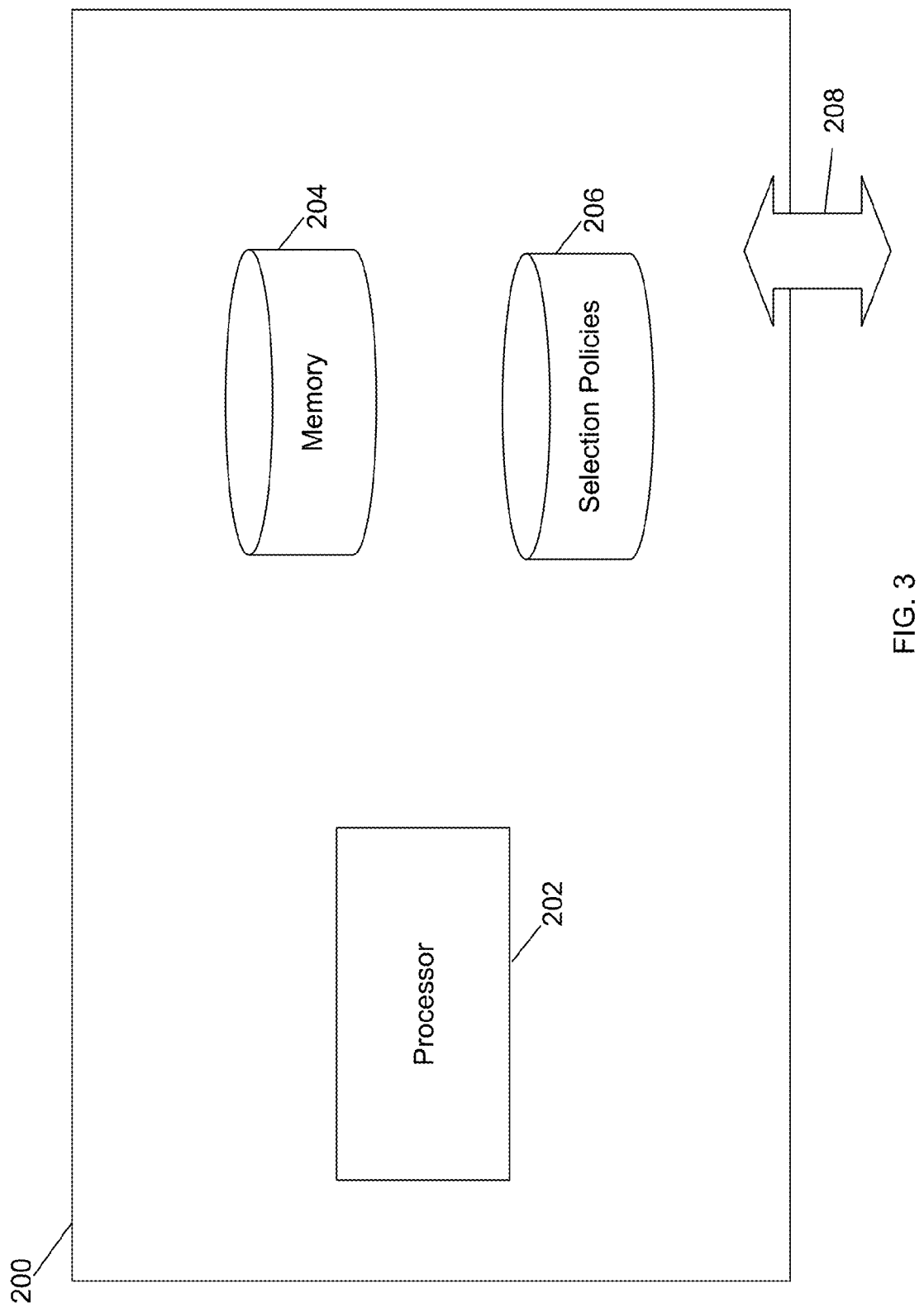
FIG. 3 illustrates a logical view of a gateway in accordance with some embodiments.

FIG. 3 illustrates a logical view of a gateway 200 in accordance with some embodiments. The gateway 200 can include one or more of a processor 202, a memory 204, a selection policy storage 206 and a network interface 208. A network interface 208 can provide an input and/or output mechanism to communicate with other network devices. The network interface 208 can provide communication with, for example, other gateways, wireless access nodes, application servers, and user equipment to send and receive data such as packets and messages. The network interface 208 can be implemented in hardware to send and receive signals in a variety of mediums, such as optical, copper, and wireless, and in a number of different protocols some of which may be non-transient. A processor 202 runs software which uses the network interface 208 and the memory 204 such as a tangible, non-transitory computer readable medium, a programmable read only memory (PROM), or flash memory. The processor 202 may be any computer chip that is capable of executing program instruction streams that are part of a software program. The processor 202 may have multiple cores for executing multiple streams of program instructions simultaneously. The processor 202 may also have multiple sub-processors which are optimized for executing particular categories of program instructions and are controlled by the processor 202. The memory 204 is capable of storing and retrieving program instructions, program data, or any other data that is used by the processor 204. The processor 202 may store and retrieve data from the memory 204 as a software program is executed. The memory 204 may includes the selection policy storage 206. The selection policy storage 206 stores information used by the gateway node 200 to select the interfaces used to establish bearer requests. The processor 202 accesses and updates the selection policy storage 206.

For a gateway 200 of type SGSN, one function of its network interface 208 is to relay network traffic between a mobile device and a packet data network. An SGSN may do so by communicating with a Packet Data Network Gateway (which may implement a Gateway GPRS Support Node functionality) or by communicating with a standalone Gateway GPRS Support Node. The gateway 200 includes software which is configured to select appropriate software interfaces for communicating with these other network nodes. While the network interface 208 is hardware that is physically capable of exchanging data with other network nodes, the gateway 200 may select an appropriate software interface with which to format and interpret that data.

One such software interface is the S4 interface. The S4 interface may be used by an SGSN to format and understand data sent to and from a Serving Gateway. The Serving Gateway may act as an intermediary, passing messages to and from a Packet Data Network Gateway, using a separate interface. Alternatively, an SGSN may used the Gn/Gp interface to communicate directly with either a Packet Data Network Gateway or a Gateway GPRS Support Node. Each time a gateway 200, such as an SGSN, receives a request to create a packet data session, the gateway 200 has an opportunity to select the appropriate software interface to use while establishing that session. The software interface is used for, among other functions, conveying Quality of Service information between the requesting mobile device and other network nodes responsible for determining and enforcing that Quality of Service. As described above, there are various issues associated with selecting the software interface (e.g., either S4 or Gn/Gp) to perform these communications. Selecting an appropriate software interface may alleviate or eliminate these issues.

A gateway 200 may receive message from mobile devices using its network interface 208. When a gateway 200 receives such a message from a mobile device requesting that a packet data session be created, the processor 202 may execute software to select an appropriate software interface based on an identifier associated with that mobile device. In some of these embodiments, the software first uses the message to check if an identifier for the mobile device was learned during the mobile device's initial attach procedure. Such an identifier may be the mobile device's International Mobile Equipment Identity number. If no such identifier was previously obtained, the software may initiate a procedure to request that the mobile device transmit its identifier to the gateway 200.

Once the identifier has been obtained, either from the initial attach procedure or from the request procedure, the software may reference the selection policy storage 206 to determine the appropriate software interface for the given identifier. In some embodiments, the selection policy storage 206 is pre-configured with rules defining the software interface to select for mobile devices having certain identifiers. For example, the selection policy storage 206 may be loaded with a database containing list entries, each entry including at least a mobile device identifier and the appropriate software interface to select for a mobile device having that identifier. A list entry may include individual mobile device identifiers, such as a single International Mobile Equipment Identity number. A list entry may also include a range of mobile device identifiers and the appropriate software interface to use for any mobile device having an identifier within that range. A range may be expressed as a wildcard expression which resolves to several International Mobile Equipment Identity numbers. If a list entry with the given mobile device identifier is found in the selection policy storage 206, the software may select the corresponding software interface from that list entry (e.g., either the S4 or the Gn/Gp software interface).

Alternatively, the processor 202 may execute software which selects an appropriate software interface for establishing a packet data session based on other contents of the request message. For example, the software may check the message for the presence of a flag specifying the software interface to select. For example, the mobile device may include a Protocol Control Options Information Element in its request. If present, the software can decode this Information Element and check for the presence or absence of the Network Request Support UE flag. If this flag is not detected, the software can determine that the UE does not support the Evolved Packet Core Quality of Service parameters and accordingly select the Gn/Gp interface. If this flag is detected, then the software can accordingly select the S4 interface.

The operator of a gateway 200 can provision the gateway's software to use either of the selection policies described above under various circumstances. The operator may also specify some combination of the above policies. For example, an operator may configure a gateway 200 to first check a packet data session request message for the presence of a particular flag. If such a flag is found, then the software can select the appropriate software interface to use for that message as described above. If such a flag is not found, then the software can proceed to select the appropriate software interface based on the identity of the requesting mobile device, also as described above. Other software interface selection policies may also be implemented alone or in combination with these policy types.

User Equipment and Gateway

The user equipment described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The gateway described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The gateway can be implemented as any combination of the following including an xGSN, an xGW, an xGW-SGW, and an xGW-PGW.

Figure 4:
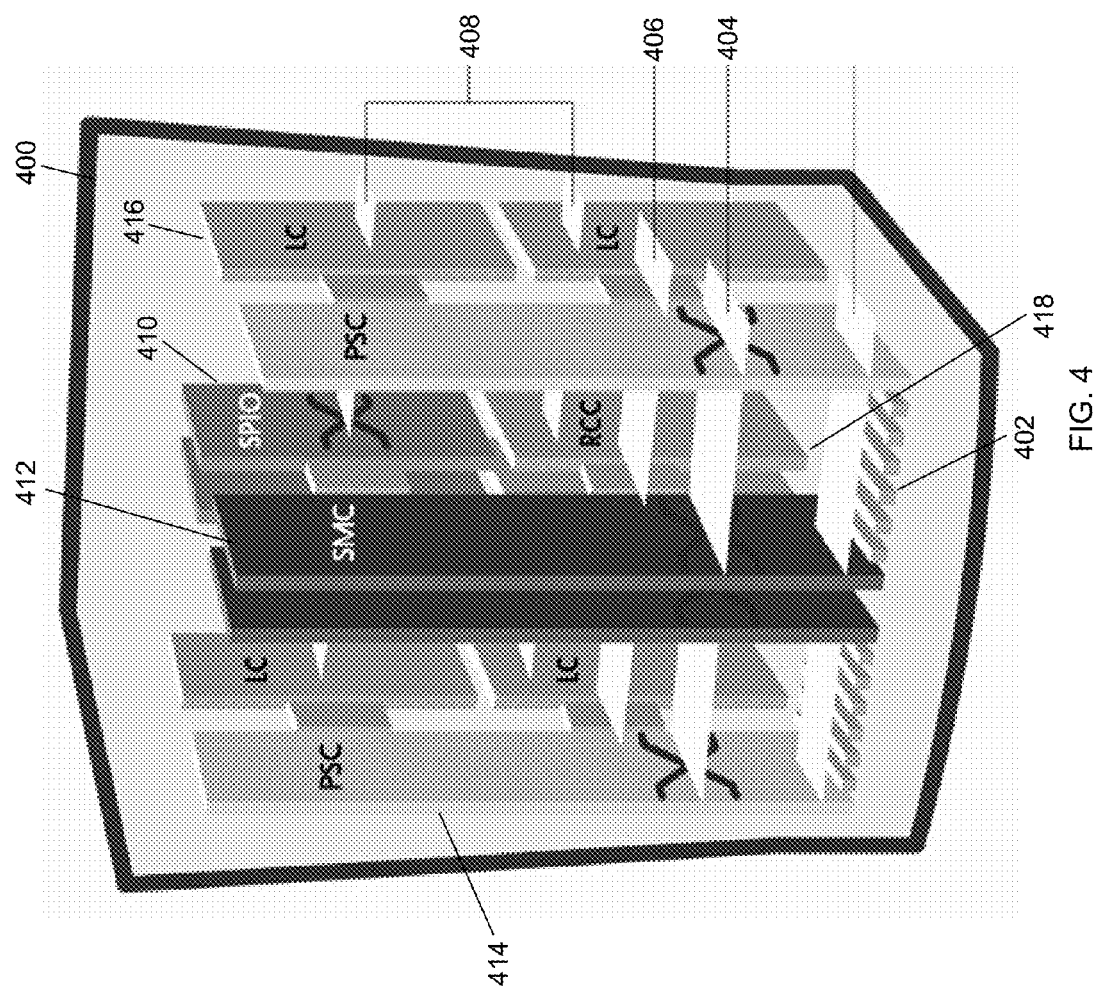
FIG. 4 illustrates a network device in accordance with some embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 4 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 5:
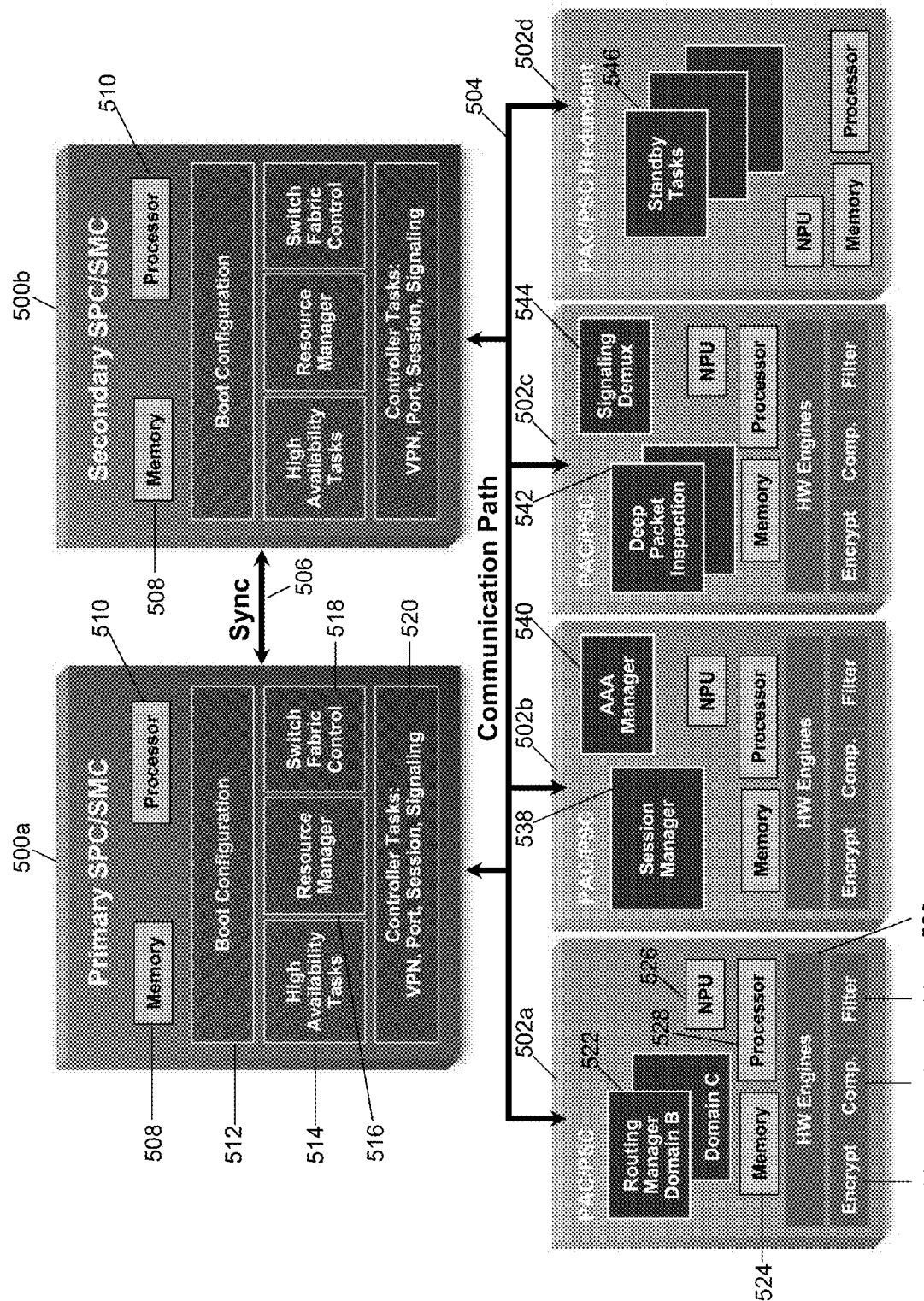
FIG. 5 illustrates a logical view of the software architecture of a network device in accordance with some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 5 illustrates a logical view of the software architecture of a network device in accordance with certain embodiments. As shown, the software and hardware can be distributed within the network device and across different circuit boards, processors, and memory. FIG. 5 includes a primary switch processor card (SPC)/system management card (SMC) 500*a*, a secondary SPC/SMC 500*b*, PAC/PSC 502*a*-502*d*, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502*a* provides routing managers 522 with each covering routing of a different domain. PAC/PSC 502*b* provides a session manager 538 and an AAA manager 540. The session manager 538 manages one or more sessions that correspond to one or more user equipment. A session allows a user equipment to communicate with the network for voice calls and data. The AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502*d* provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, LTE functionality such as a PDN gateway can be combined or co-located with the MME.

We claim:

1. A method comprising:
receiving from a mobile device a message requesting that a packet data session be allocated, wherein the message includes a requested quality of service profile for the packet data session, including at least a communication rate parameter describing a data rate expected to be provided for the packet data session;
selecting a software interface, from among a plurality of software interfaces, for communication with a packet node based at least in part on the communication rate parameter, for the packet node to provide the mobile device with access to a packet data network; and
allocating the packet data session in communication with the packet node, wherein the requested quality of service profile is conveyed to the packet node using the selected software interface.

2. The method of claim 1, wherein the selected software interface is selected based at least in part on an identity of the mobile device by matching the identity of the mobile device to a previously stored database entry listing the software interface to select for a mobile device having that identity.

3. The method of claim 2, wherein the database entry lists a software interface to select for a range of mobile device identities and the identity of the mobile device falls within that range.

4. The method of claim 2, wherein the identity of the mobile device is obtained during an initial attach procedure.

5. The method of claim 2, wherein the identity of the mobile device is obtained by a request that the mobile device transmit its identity subsequent to receiving the message.

6. The method of claim 2, wherein the identity of the mobile device is an International Mobile Equipment Identity number.

7. The method of claim 1, wherein the selected software interface is selected based at least in part on the presence or absence of a flag included in the message.

8. The method of claim 1, wherein the selected software interface is selected based at least in part on the presence of a flag included in the message, or, if the flag is absent from the message, based on the identity of the mobile device by matching the identity of the mobile device to a previously stored database entry listing the software interface to select for a mobile device having that identity.

9. The method of claim 1, wherein the selected software interface is either the S4 interface or the Gn/Gp interface and the packet node is either a Packet Data Network Gateway (PGW) or a Gateway GPRS Support Node (GGSN).

10. The method of claim 1, wherein the message is received at a gateway, the selected software interface is a software interface of the gateway, and the requested quality of service profile is transmitted by the gateway to the packet node through the selected software interface.

11. A gateway comprising:
   interfaces configured to provide communication with other network devices and to receive from a mobile device a message requesting that a packet data session be allocated, wherein the message includes a requested quality of service profile for the packet data session, including at least a communication rate parameter describing a data rate expected to be provided for the packet data session;
   a memory configured to store a module; and
   a processor configured to run the module stored in memory to select a software interface, from among a plurality of software interfaces, for use over the network interface to communicate with a packet node based at least in part on the communication rate parameter, wherein the packet node provides the mobile device with access to a packet data network, and to allocate the packet data session in communication with the packet node, wherein the requested quality of service profile is conveyed to the packet node using the selected software interface.

12. The gateway of claim 11, wherein the selected software interface is selected based at least in part on an identity of the mobile device by matching the identity of the mobile device to a previously stored database entry listing the software interface to select for a mobile device having that identity.

13. The gateway of claim 12, wherein the database entry lists a software interface to select for a range of mobile device identities and the identity of the mobile device falls within that range.

14. The gateway of claim 12, wherein the identity of the mobile device is obtained during an initial attach procedure.

15. The gateway of claim 12, wherein the identity of the mobile device is obtained by a request that the mobile device transmit its identity to the gateway subsequent to receiving the message.

16. The gateway of claim 12, wherein the identity of the mobile device is an International Mobile Equipment Identity number.

17. The gateway of claim 12, wherein the selected software interface is selected based at least in part on the presence or absence of a flag included in the message.

18. The gateway of claim 12, wherein the selected software interface is selected based at least in part on the presence of a flag included in the message, or, if the flag is absent from the message, based on the identity of the mobile device by matching the identity of the mobile device to a previously stored database entry listing the software interface to select for a mobile device having that identity.

19. The gateway of claim 12, wherein the selected software interface is either the S4 interface or the Gn/Gp interface and the packet node is either a Packet Data Network Gateway (PGW) or a Gateway GPRS Support Node (GGSN).

20. One or more non-transitory computer-readable media comprising instructions that when executed are operable to:
   receive from a mobile device a message requesting that a packet data session be allocated, wherein the message includes a requested quality of service profile for the packet data session, including at least a communication rate parameter describing a data rate expected to be provided for the packet data session;
   select a software interface, from among a plurality of software interfaces, for communication with a packet node based at least in part on the communication rate parameter, for the packet node to provide the mobile device with access to a packet data network; and
   allocate the packet data session in communication with the packet node, wherein the requested quality of service profile is conveyed to the packet node using the selected software interface.

21. The media of claim 20, wherein the selected software interface is selected based at least in part on an identity of the mobile device by matching the identity of the mobile device to a previously stored database entry listing the software interface to select for a mobile device having that identity.

* * * * *